April 8, 1969   D. W. CARLSON ET AL   3,437,109
AIR PRESSURE REGULATOR

Filed May 26, 1967

INVENTORS
DONALD W. CARLSON
HERBERT EGERER
BY

United States Patent Office 3,437,109
Patented Apr. 8, 1969

3,437,109
AIR PRESSURE REGULATOR
Donald W. Carlson, 3706 Lake St., and Herbert Egerer, 3710 Lake St., both of Omaha, Nebr. 68111
Filed May 26, 1967, Ser. No. 641,673
Int. Cl. F16k 31/36
U.S. Cl. 137—505.25      3 Claims

ABSTRACT OF THE DISCLOSURE

A compact air pressure regulator of light weight and small size having a spring adjusting means incorporating means to prevent rotation of the adjusting knob and means whereby excessive rotation will not result in the loss of the adjusting knob.

---

An air pressure regulator of light weight and small size having an annular valve member which is caused to seat against the pressure of a spring by pressure against a controlling piston on that side of the piston which is disposed toward the outlet of the regulator, such seating being at a pre-determined pressure.

The regulator as described in which the pre-determined pressure is quickly adjustable by the selective positioning of a valve seat-carrying valve plug portion with respect to a valve body in which the annular valve member and piston are mounted.

In the prior art, pressure regulators have been large and bulky, and even the smallest have been unsuited for placement on a portable tool. For this reason, it is an object of this invention to provide a regulator of miniature size and of a design making possible a weight of not more than three ounces.

A further object is to provide a pressure regulator which can be attached directly to that part of a portable tool which is continually being supported in the hands of an operator.

A further object is to provide a positive pressure regulator for intermittent use.

Another object is to provide a regulator in which the pre-determined pressure is minutely and exactly variable.

In the prior art, regulators have been so large and bulky and so expensive that it has been desirable to use them where they can remain stationary, often controlling many separate hand tools with the disadvantage that each of these tools would operate much better if it could have its own regulator and its own selectively variable air pressure, even though each tool might be connected to the same original source of compressed air.

A further object is to provide a regulator as described having a one-way relief valve in it to automatically prevent danger from the storage of tools which might otherwise have air trapped in them, thus providing relief from a safety hazard.

Other objects include the provision of a regulator as described which is inexpensive to manufacture with high precision, and a design which is used in combination with an air filter.

Figure 1:
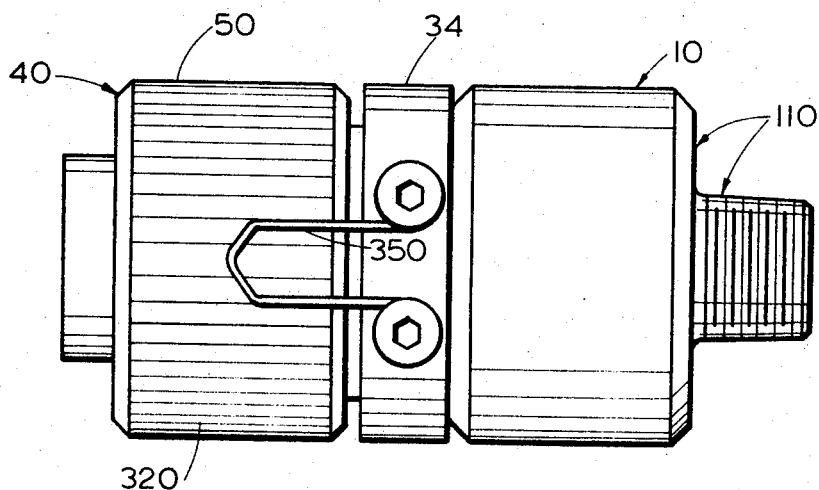
FIGURE 1 is a top plan view of the air pressure regulator of this invention.
Figure 2:
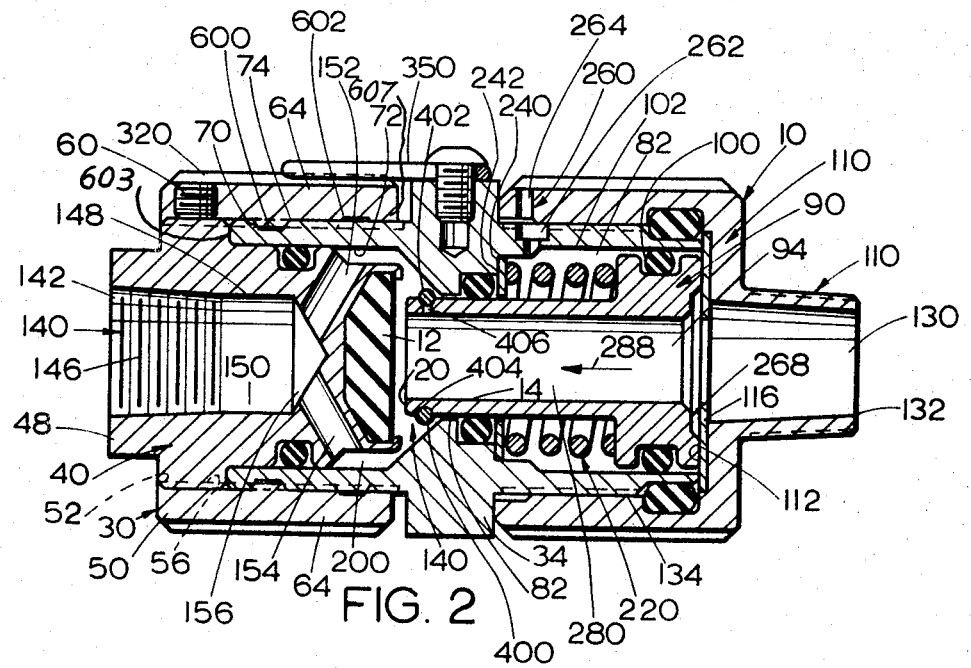
FIGURE 2 is a vertical section taken through the regulator of FIGURE 1 and with an annular valve member in an open position, and with a valve seat carrying valve plug portion adjustably positioned for the closing of the valve at a lighter pressure.
Figure 3:
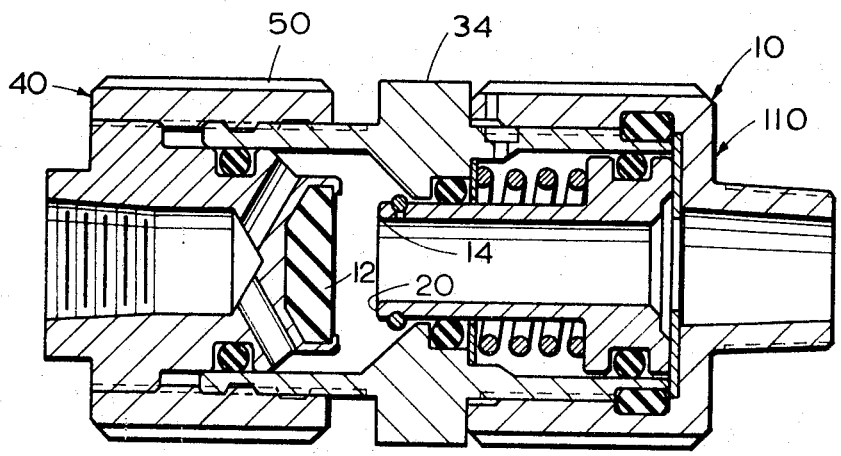
FIGURE 3 is a view similar to FIGURE 2 but showing the valve seat carrying valve plug portion in an adjusted position for valve closure only when a higher pressure is in actuation.
Figure 4:
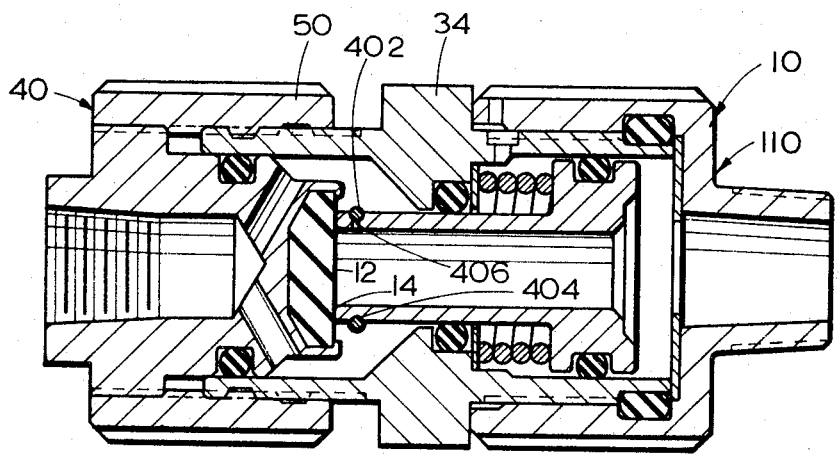
FIGURE 4 is a view similar to FIGURE 3 as regards adjusted positions for pre-determined closing pressure, but FIGURE 4 shows the annular valve member and other parts in the position for valve closure.

The air pressure regulator of this invention is generally indicated at 10, and is best seen in FIGURE 2, has a resilient valve seat 12 and an annular valve member 14, the member 14 having an annular end portion 20 disposed in a position for seating against the valve seat 12, at times, for sealing the annular end portion to close the regulator, as later described.

A housing assembly 30 is provided having as one of its parts a valve body portion 34 of annular shape and having as another of its parts a valve plug portion 40 which is attached to and carries the valve seat 12.

The valve plug portion 40 is attached to the valve body 34 by means of having the valve plug portion 40 in two parts, an inner part 48 and an outer part 50. The outer part 50 is annular and is provided with threads 52 on its inner side which are meshed with threads 56 on a cylindrical outer surface of the inner valve plug portion 48. The valve plug portions 48 and 50 are prevented from rotating with respect to each other by a set screw 60.

The outer valve plug portion 50 has a cantilevered portion 64 which is spaced from the inner valve plug portion 48 by the reception therebetween of a projecting generally cylindrical annular extension 70 of the valve body 34.

The annular extension 70 has a smooth cylindrical inner surface 72 and a threaded cylindrical outer surface 74, which later is disposed in mesh with the threads on the inner side of the outer valve plug member 50 whereby by rotating the outer valve plug member 50, the effective distance of the valve seat 12 from a rested position of the annular valve member 14 can be regulated for pre-determining the amount of pressure at which the annular valve member 14 will seat, as later described.

The valve body portion 34 has a first opening means 82 therethrough in which the annular member 14 reciprocates to seat and unseat. An annular piston means 90 is provided in the valve body portion opening 82 and is connected to the annular valve member 14 and the piston 90 has a second opening means 94 therethrough disposed in communication with the interior of the annular valve member 14.

The piston means 90 is adapted to snugly fit into and to reciprocate in the opening 82 for moving toward and away from the valve seat 12.

The piston means 90 has an O-ring 100 mounted on its exterior for snugly engaging a cylindrical wall portion 102 of the opening 82.

The housing asembly 30 further has an annular piston stop portion 110 attached to the valve body 34 and forming a part thereof, the stop portion 110 having a first shoulder means 112 disposed at that end of the piston 90 which faces away from the valve seat 12, the shoulder means 112 preventing the piston 90 from moving excessively away from the valve seat 12.

The annular piston stop portion 110 can have as one of its parts a spacer washer 116 permanently secured thereto, although the spacer washer 116 can also be eliminated. The piston stop portion 110 has a third opening means 130 therethrough in communication with the exterior of the regulator, or in other words, with an outlet 132.

The piston stop portion 110 can be attached to the valve body portion 34 in any suitable manner but is preferably permanently secured by means of cement as shown at 134.

The housing assembly 30 has what shall be called a first flow passage means 140 having an inlet 142 at the exterior of the assembly 10, the inlet 142 extending into the inner part 48 of the valve plug portion 40 specifically and the first flow passage means 140 having a first chamber 146 which has threaded walls, a second chamber 148 in communication therewith which has cylindrical walls and in which an air filter 150 is disposed, two or more branch chambers 152 and 154 leading from a connecting chamber 156 to the exterior of the inner part 48 of the valve plug portion 40 at positions alongside but slightly spaced from the valve seat 12, as best seen in FIGURE 2.

The connecting chamber 156 is connected to the chamber 148 whereby the total first flow passage means 140 forms communication from its inlet 142 with the valve member annular end portion 20 at times when the latter is spaced from the valve seat 12. This is because the branch flow passages 152 and 154 open upon a recess 200 in the valve body 34 which has walls spaced from the valve plug inner portion 48.

The recess 200, therefore, forms a part of the total first flow passage means 140.

A compression spring means 220 is provided in the valve body first opening means 82 and the spring means 220 has one end engaging the seat side of the piston 90 and urging the piston 90 away from the valve seat 12.

Spring anchoring means 240 fixed to and forming a part of the valve body 34 engages the spring means 220 and the valve body shoulder 242 for preventing movement of the valve seat end of the spring means 220 toward the valve seat.

Breathing hole means generally indicated at 260 extends from the valve body portion first opening means 82 on the valve seat side of the piston 90 through the valve body 34 in a first breathing hole section 262 and through the spring stop portion 110 in a second breathing hole section 264, the sections 262 and 264 being in communication.

The purpose of the breathing hole means 260 is to prevent air lock of the piston means 90 by permitting air to move into and out of the first opening means 82.

The regulator 10 has a second flow passage 280 having as one of its parts the interior of the annular valve member 20 and having as a second one of its parts the interior of the annular piston 90, which latter is the second opening means 94.

The piston 90 has a pressure-receiving surface 268 on the side thereof which is opposite the valve seat 12 and the surface 268 extends transversely to directions of piston reciprocation so as to be accessible to air pressure from the second flow passage 280.

In operation and at times when the outlet 132 is connected to an air pressure tool, and at times when air has flowed through the open valve until pressure has increased inside the tool, then pressure against the pressure-receiving surface 268 will cause the piston to move in the direction of the arrow 288 closing the valve member 14 against the seat 12.

As this movement of the piston 90 toward the seat 12 is against the pressure of the spring 220 with the pressure from the spring increasing as it becomes progressively compressed, therefore, the positioning of the valve seat 12 with respect to the valve body 34 can pre-determine a given pressure at which the regulator opens.

The rotation of the outer part 30 of the valve plug portion 40 on the valve body 34 will accurately and selectively position the valve seat 12 for selecting the pre-determined pressure of operation.

Rotation of the outer part 50 of the valve plug portion 40 is facilitated by means of a series of serrations 320 on the outer part 50 which latter can be engaged by the fingers for rotation and which are engaged by a spring 350 attached to the exterior of the valve body portion 34 for preventing undesired rotation of the valve plug portion 40 with respect to the valve body 34.

Referring again to FIGURE 2, a one-way sub-valve means 400 is provided in the annular valve member 14 for allowing flow from the interior of the valve member 14 therethrough to the first flow passage means 140.

The one-way sub-valve 400 comprises a small O-ring 402 in a recess 404 in the annular valve member 14 and extending around its circumference with a sub-valve opening 406 extending through the annular valve member 14 to the recess 402, the opening 406 ordinarily being kept closed by the O-ring 402.

The advantage of the one-way sub-valve means 400 is that at times when a pressure tool is not in use, and at times when the regulator 10 is closed, the dangerous air under pressure in the tool can escape through the sub-valve means 400 for rendering the tool harmless in case it is accidentally operated.

It is desirable that the regulator have our concept of a design for preventing its main parts, that is, its valve plug 40 and its valve body 34 from becoming separated. This is accomplished by the provision of an annular groove in the valve body 34 and is shown at 600 extending circumferentially therearound and interrupting the threads on its exterior and further by providing a second circular groove 602 on the valve plug outer member 50 and interrupting the threads thereof and extending therearound in a position for cooperation with the groove 600 at times when the grooves are opposite each other, with the grooves 600 and 602 positioned for causing their respective adjacent threads to come out of mesh with each other, whereby the valve plug outer member 50 will not further rotate but will harmlessly rest upon the valve body 34.

It will be seen that the cantilevered portion 64 can also be called an annular threaded means 64 and that the annular groove 600 is spaced from one end 603 of the body portion and interrupts the threads on the annular threaded means 64. The groove 602 is spaced from the adjacent end of the cantilevered portion 64 in a manner such that a detent section 607 is formed between the groove 602 and the adjacent innermost end of the cantilevered portion 64, the detent section 607 having portions receivable in the annular groove 600 of the body portion when the valve plug portion is in a certain open position to detain the valve plug portion from becoming completely separated from the body portion.

As thus described, it is believed evident that this invention has provided an air pressure regulator of light weight and small size which can be readily and accurately adjusted to close at a pre-determined pressure, and which further fulfills all of the objectives above set forth.

We claim:

1. An air pressure regulator comprising: a valve seat, an annular valve member having an annular end portion disposed in a position for seating against said valve seat at times for sealing said annular end portion, a housing assembly comprising a valve body portion of annular shape, said assembly further comprising a valve plug portion attached to and carrying said valve seat, said valve plug portion being attached to said valve body portion, said valve body portion having a first opening means therethrough in which said annular valve member reciprocates to seat and unseat, an annular piston means in said valve body portion opening means and connected to said annular valve member and having a second opening means therethrough, said piston means being adapted to snugly fit into and to reciprocate in said opening toward and away from said valve seat, said housing assembly further comprising an annular piston stop portion attached to said valve body and having a first shoulder means disposed at that end of said piston which faces away from said valve seat and preventing said piston from moving excessively away from said valve seat, said piston stop portion having a third opening means therethrough in communication with the exterior of said regulator, said housing assembly having first flow passage means having an inlet at the exterior of said assembly and extending into communication with said valve member annular end portion when the latter is spaced from said valve seat, compression spring means in said valve body opening means and having one end engaging the seat side of said piston and urging it away from said valve seat, spring anchoring means in said valve body engaging said spring means and said valve body for preventing movement of the valve seat end of said spring means toward said valve seat, breathing hole means extending from said valve body portion opening means on the valve seat side of said piston means through to the exterior of said regulator to prevent air lock of said piston means, said regulator having a second flow passage comprising the interiors of said annular valve member and said annular piston and the opening through said annular piston stop portion, said piston means having a pressure-receiving surface on the side thereof opposite said valve seat and extending transversely to directions of piston reciprocation, said pressure-receiving surface being accessible to air pressure from said second flow passage, and a one-way sub-valve means in said annular valve member and allowing flow from its interior therethrough to said first flow passage.

2. The combination of claim 1 in which said valve plug portion is adjustably attached to said valve body portion for selective positioning of said valve seat, such adjustable attachment being a threaded attachment, rotation preventing means cooperatively correlated with said valve body and valve plug portions for preventing their undesired rotation with respect to each other as a result of vibration, said rotation preventing means comprising a spring attached to the exterior of said valve body portion and engaging the exterior of said valve plug portion.

3. The combination of claim 1 in which said valve plug porition is adjustably attached to said valve body portion for selective positioning of said valve seat, such adjustable attachment being a threaded attachment, means limiting movement of said valve plug portion away from said valve body porition comprising: said valve body portion having external threads on one end thereof, annular threaded means attached to said valve plug portion and provided with threads enmeshed with the threads of said valve body portion for the adjustable positioning of said valve seat of said valve plug portion with respect to said body portion annular end portion of said valve member by the rotation of said annular threaded means on said valve portion with respect to said body portion, an annular groove disposed in a position spaced inwardly from one end of said body portion and interrupting the threads thereon, a second annular groove disposed on said annular threaded means and spaced from an inner end thereof and interrupting the threads of said annular threaded means, said plug portion having a detent section between its said annular groove and its innermost end, said detent section having portions receivable in the said annular groove of said body portion when said valve plug portion is in a certain open position to detain said plug portion from becoming completely separated from said body portion.

References Cited
UNITED STATES PATENTS

| | | | |
|---|---|---|---|
| 614,441 | 11/1898 | Burnett | 137—505.25 |
| 2,784,934 | 3/1957 | Paulius | 251—297 XR |
| 2,853,114 | 9/1958 | Barry | 151—69 |
| 3,004,686 | 10/1961 | McKee | 137—505.25 XR |

HAROLD W. WEAKLEY, *Primary Examiner.*

U.S. Cl. X.R.

251—297